United States Patent Office 3,729,484
Patented Apr. 24, 1973

3,729,484
1-(3-SULFAMOYL-4-CHLORO-BENZAMIDO)-3-(2-FURYL)-PYRROLIDINE
Laszlo Beregi, Boulogne-sur-Seine, Pierre Hugon, Rueil-Malmaison, and Michel Laubie, Vaucresson, France, assignors to Societe en nom Collectif "Science Union et Cie, Societe Francaise de Recherche Medicale," Suresnes, France
No Drawing. Filed Feb. 19, 1971, Ser. No. 117,053
Claims priority, application Great Britain, Mar. 10, 1970, 11,430/70
Int. Cl. C07d 27/04
U.S. Cl. 260—326.3                   1 Claim

ABSTRACT OF THE DISCLOSURE

Furan compound of the formula:

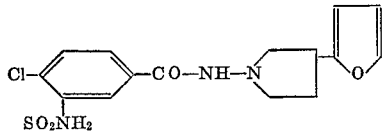

This compound possesses diuretic and antihypertensive properties.

---

The present invention provides furan compound of the formula:

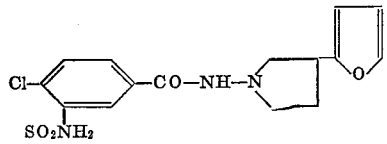
(I)

This new furan compound may be prepared by reacting the appropriate N-amino pyrrolidinyl furan compound of the formula:

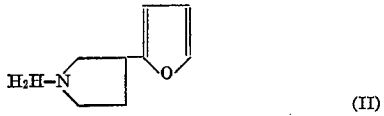
(II)

with 3 - sulfamoyl - 4-chloro-benzoyl chloride of the formula:

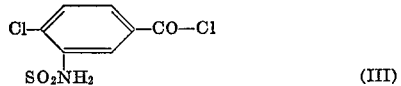
(III)

N-amino pyrrolidinyl furan used as starting material was prepared according to the process of J. B. Wright, R. E. Willette, J. Med. and Pharm. Chem. 5, 811 (1962), which involves nitrosating the pyrrolidinyl furan and reducing the resulting N-nitroso compound with lithium aluminium hydride.

The following example illustrates the invention, the parts being by weight and the melting points being determined by the Kofler method.

EXAMPLE 1-(3-sulfamoyl-4-chloro-benzamido)-3-(2-furyl) pyrrolidine

A total of 12.5 parts of 3-sulfamoyl-4-chloro-benzoyl chloride in a solution of 70 parts of anhydrous tetrahydrofuran are added portion-wise in the course of 30 minutes, while stirring, to a solution of 7.5 parts of 1-amino-3-(2-furyl) pyrrolidine and 5 parts of triethylamine in 180 parts of anhydrous tetrahydrofuran.

The reaction mixture is stirred 1 hour at room temperature, the precipitated triethylamine hydrochloride is filtered off. The filtrate is evaporated in vacuum, the residue is crystallized from a solution of 100 parts of ethanol.

There were obtained 9.6 parts of 1-(3-sulfamoyl-4-chloro-benzamido)-3-(2-furyl) pyrrolidine, melting at 186° C.; recrystallized from dimethylformamide/water, M.P. 186° C.

The compound of this invention possesses valuable pharmacological and therapeutic properties, especially diuretic and antihypertensive activity and may thus be used as medicine in the treatment of hydrosaline retention and hypertension.

Its toxicity is very low and the $LD_{50}$ in mice is $>3$ g./kg. by oral route.

The diuretic activity was studied in the rat and in the dog. The compound is designated in the following experimental results under the code number S.2267.

I—EXPERIMENTATION IN RATS

(1) Rats with hydrosaline excess

The animals are fasting for 18 hours before the experimentation and the water-drinking is taken off from them just one hour before. They receive by oral route a quantity of hydrosaline solution (2,5 ml. of physiological salt solution for 100 g. weight). Each rat's urine is collected during five hours. The compound to be studied is administered orally together with the quantity of salt solution.

Results:

TABLE 1

| Dose in mg./kg., P.O. | Number of animals | Urinary volume, ml./rat/5 hrs. | Excretion in meq./rat/5 hours | | |
|---|---|---|---|---|---|
| | | | Na+ | K+ | Cl− |
| 0 | 10 | 7.7 | 0.51 | 0.38 | 0.76 |
| 0.1 | 10 | 7.6 | 0.70 | 0.30 | 0.87 |
| 0.3 | 10 | 10.7 | 1.12 | 0.42 | 1.41 |
| 1 | 10 | 12 | 1.30 | 0.39 | 1.59 |
| 3 | 10 | 12.5 | 1.51 | 0.49 | 1.87 |
| 10 | 10 | 11.6 | 1.37 | 0.39 | 1.58 |

(2) Hydropenic rats

The animals are left without food and water 18 hours before the experimentation. They receive by oral route an extra quantity of hydrosaline solution (2.5 ml. of a physiological solution for 100 g. of weight). Measures are carried out five hours after the administration of the compound S.2267.

Results:

TABLE 2

| Dose in mg./kg., P.O. | Number of animals | Urinary volume, ml./rat/5 hrs. | Excretion in meq./rat/5 hours | | |
|---|---|---|---|---|---|
| | | | Na+ | K+ | Cl− |
| 0 | 10 | 2.7 | 0.20 | 0.17 | 0.21 |
| 0.1 | 10 | 5.7 | 0.67 | 0.34 | 0.87 |
| 0.3 | 10 | 5 | 0.58 | 0.31 | 0.99 |
| 1 | 10 | 5.5 | 0.67 | 0.35 | 1.21 |
| 3 | 10 | 5.9 | 0.92 | 0.37 | 1.72 |
| 10 | 10 | 7.2 | 1.05 | 0.31 | 1.19 |

(3) Hydrated rats

The animals are fasting for 18 hours before the experimentation. On starting of the experimentation, they receive 2.5 ml. for 100 g. of weight, of distilled water. The S.2267 is administered together with the water.

Results:

TABLE 3

| Dose in mg./kg., P.O. | Number of animals | Urinary volume, ml./rat/5 hrs. | Excretion in meq./rat/5 hours | | |
|---|---|---|---|---|---|
| | | | Na+ | K+ | Cl− |
| 0 | 10 | 7.7 | 0.08 | 0.17 | 0.09 |
| 0.1 | 10 | 9 | 0.33 | 0.29 | 0.36 |
| 0.3 | 10 | 13.5 | 0.65 | 0.32 | 0.74 |
| 1 | 10 | 12.8 | 0.56 | 0.39 | 0.80 |
| 3 | 10 | 8.5 | 0.43 | 0.28 | 0.52 |
| 10 | 10 | 9 | 0.42 | 0.37 | 0.61 |

II—EXPERIMENTATION IN THE DOG (1) Aqueous diuresis in the non-anaesthetized dog The animals are fastening for 18 hours before the experimentation. On the experimentation day they receive orally 30 ml. of water per kg. and then 15 ml. every hour. A catheter is set up in the bladder. When the urinary flow has became steady, the compound to be studied is administered by intravenous route. Urines are collected and their volume is measured very ten minutes during the first hour following the administration of the compound and then every hour. In the collected urines, Na+, K+, Cl− are dosed, and the elimination of ions in µeq/min. is calculated.

The Table 4 shows the average of the results obtained with 0.1 mg./kg. I.V. of S.2267.

TABLE 4

| Time | Urinary volume (ml./min.) | Elimination, µeq/minute | | |
|---|---|---|---|---|
| | | Cl | Na | K |
| −20 minutes | 4.6 | 38 | 47 | 34 |
| −10 minutes | 3.1 | 30 | 39 | 26 |
| +10 minutes | 6.3 | 183 | 175 | 50 |
| +20 minutes | 5.9 | 255 | 224 | 58 |
| +30 minutes | 5.1 | 245 | 196 | 58 |
| +40 minutes | 5.2 | 249 | 197 | 67 |
| +1 hour | 4.7 | 227 | 169 | 55 |
| +2 hours | 3.8 | 253 | 201 | 70 |
| +3 hours | 3.7 | 148 | 109 | 68 |
| +4 hours | 4.2 | 108 | 73 | 50 |

(2) The action of the S.2267 on the water and electrolytes' excretion in the non-anaesthetised dog.

Experimental procedure

The animals are placed in metabolism boxes and they receive every 24 hours 3 meq. Na+/kg. The bladder is emptied every day when the taking up urines. The 24 hours urines are collected and the Na+, Cl−, K+ are determined. The S.2267 is administered by oral route at a dose of 0.3, 1 and 3 mg./kg.

The 24 hours urines are collected for the consecutive days.

TABLE 5

| Dose mg./kg., P.O. | Number of animals | Urinary volume 24 hrs. | | | Na+(meq./24 hrs.) | | | K+(meq./24 hrs.) | | | Cl−(meq./24 hrs.) | | |
|---|---|---|---|---|---|---|---|---|---|---|---|---|---|
| | | C | 24 hrs. | 48 hrs. | C | 24 hrs. | 48 hrs. | C | 24 hrs. | 48 hrs. | C | 24 hrs. | 48 hrs. |
| 0.3 | 3 | 187 | 386 | 160 | 27 | 76 | 16 | 11 | 28 | 11 | 25 | 98 | 15 |
| 1 | 3 | 390 | 580 | 280 | 57 | 83 | 27 | 28 | 30 | 22 | 55 | 106 | 36 |
| 3 | 3 | 290 | 650 | 310 | 46 | 102 | 44 | 23 | 40 | 23 | 42 | 168 | 49 |

NOTE.—C=control before treatment.

The compound does not modify notably the blood pressure of normal animals, but decreases from 20 to 40 mm. Hg, the blood pressure of dog with experimental hypertension.

So the new compound may be successfully used in the treatment of oedema or ascites in cardiac, renal or hepatic insufficiency, of hypertension or obesity.

It may be administered by oral, rectal or parenteral route in the form of tablets, dragees, capsules, suppositories or injections, in admixture or conjunction with suitable pharmaceutical carriers, such for example, as distilled water, glucose, lactose, starch, talc, magnesium stearate, ethyl-cellulose or cocoa-butter.

The doses may vary from 10 to 100 mg./day, preferably from 30 to 60 mg./day.

What we claim is:

1. Furan compound of the formula:

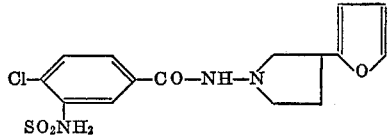

References Cited

UNITED STATES PATENTS 3,560,522  2/1971  Gmunder et al. ____ 260—326.5

ALEX MAZEL, Primary Examiner

J. A. NARCAVAGE, Assistant Examiner

U.S. Cl. X.R.

424—274